US011036365B2

(12) United States Patent
Ens et al.

(10) Patent No.: US 11,036,365 B2
(45) Date of Patent: Jun. 15, 2021

(54) HANG CONDITION MITIGATION FOR BROWSER APPLICATIONS

(71) Applicant: Microsoft Technology Licensing, LLC, Redmond, WA (US)

(72) Inventors: Michael J. Ens, Redmond, WA (US); Alex Glover, Carnation, WA (US); Stefan F. Smolen, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 91 days.

(21) Appl. No.: 16/435,365

(22) Filed: Jun. 7, 2019

(65) Prior Publication Data

US 2020/0387272 A1 Dec. 10, 2020

(51) Int. Cl.
*G06F 3/0483* (2013.01)
*G06F 3/0484* (2013.01)

(52) U.S. Cl.
CPC ........ *G06F 3/0483* (2013.01); *G06F 3/04842* (2013.01)

(58) Field of Classification Search
CPC ............................ G06F 3/0483; G06F 3/04842
See application file for complete search history.

(56) References Cited

U.S. PATENT DOCUMENTS

| 7,424,644 B2 * | 9/2008 | Canning .............. G06F 11/0715 714/34 |
| 8,667,505 B2 * | 3/2014 | Woods ................ G06F 11/0718 719/314 |
| 9,070,211 B1 | 6/2015 | Kroeger et al. |
| 9,658,747 B2 * | 5/2017 | Rossi ..................... G06F 3/0483 |
| 10,503,371 B2 * | 12/2019 | Rossi ..................... G06F 3/0483 |
| 2003/0018681 A1 * | 1/2003 | Subramanian ........ G06F 9/3861 718/102 |
| 2006/0225107 A1 * | 10/2006 | Seetharaman ......... H04N 7/163 725/100 |
| 2009/0183154 A1 * | 7/2009 | Miskelly ................ G06F 9/485 718/100 |
| 2010/0153927 A1 * | 6/2010 | Stall .................... G06F 11/3624 717/128 |

(Continued)

OTHER PUBLICATIONS

"International Search Report and Written Opinion Issued in PCT Application No. PCT/US20/029181", dated Jul. 31, 2020, 10 Pages.

*Primary Examiner* — Shen Shiau
(74) *Attorney, Agent, or Firm* — Fiala & Weaver P.L.L.C.

(57) ABSTRACT

Methods, systems, and computer program products are provided for detecting a browser hang condition and causing the browser to enter into a mitigation state. For instance, a window or tab of the browser executes via a first thread of the browser, and third-party code executes via a second thread of the browser. The first thread issues a hang resistance message to the second thread and waits for a response from the second thread. The second thread processes the hang resistance message after processing all other messages in its queue. Thus, if the first thread receives the response, the first thread determines that the second thread has not entered into a hang condition. However, if the first thread does not receive the response, the first thread determines that the second thread has entered into a hang condition and subsequently causes the browser to enter the mitigation state.

20 Claims, 8 Drawing Sheets

(56) References Cited

U.S. PATENT DOCUMENTS

| | | | | |
|---|---|---|---|---|
| 2011/0029595 A1* | 2/2011 | Thayer | ............... | G06F 9/54 |
| | | | | 709/203 |
| 2011/0276899 A1* | 11/2011 | Li | ............... | G06Q 10/107 |
| | | | | 715/752 |
| 2012/0066616 A1* | 3/2012 | Woods | ............... | G06F 11/0718 |
| | | | | 715/752 |
| 2014/0108496 A1 | 4/2014 | Heller et al. | | |
| 2015/0095758 A1* | 4/2015 | Rossi | ............... | G06F 16/958 |
| | | | | 715/234 |
| 2015/0095838 A1* | 4/2015 | Rossi | ............... | G06F 3/0483 |
| | | | | 715/777 |
| 2018/0349181 A1* | 12/2018 | Steffen | ............... | G06F 9/54 |

* cited by examiner

HANG CONDITION MITIGATION FOR BROWSER APPLICATIONS

BACKGROUND

A web browser (or "browser") is a software application for accessing information on the World Wide Web. A web browser is installed on user devices to enable users of those devices to retrieve resources (e.g., individual web pages, images, videos, etc.) from a web server and display them on the user devices. Web browsers are also used to run applications (e.g., webmail, online retail sales, online auction), referred to as "web applications" or "web apps." A web application is a client-server computer program in which the client (including the user interface and client-side logic) runs in a web browser. The client communicates with the server as needed to fulfill the functions of the web application at the user device.

As web browsers have progressed over the years, enterprises have developed content that takes advantage of the increasing capability of the advancing web browsers as well as the capabilities of new web browsers. In some cases, content, such as a web application, developed for a particular web browser type and/or browser version has not been updated to be compatible with more modern web browsers and/or browser versions. Accordingly, such content may be incompatible with newer web browsers and/or browser versions, and thus is forced to be run in less advanced browser types and/or versions.

These less advanced browsers are not as robust as the newer browsers and are thus more prone to error, especially when executing third party code (e.g., JavaScript, ActiveX controls, plugins, etc.). For example, in certain instances, a window or tab in which such code executes may hang or freeze, and the user is no longer able to provide user input. In response, the user may attempt to use a new window or tab to view Web content. However, when attempting to do so, the new window or tab may also begin to hang. As a result, the user is forced to shut down and relaunch the browser.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for detecting hang condition with respect to a browser and causing the browser to enter into a mitigation state that mitigates the effect of the hang condition. For instance, a window or tab may execute via a first thread of the browser, and third-party code may execute via a second thread of the browser. The first thread may be configured to issue a hang resistance message to the second thread and wait for a response for the message from the second thread. The second thread may be configured to process the hang resistance message after processing all other messages in its queue. Thus, if the first thread receives the response, the first thread determines that the second thread has not entered into a hang condition. However, if the first thread does not receive the response (e.g., within a predetermined time period), the first thread determines that the second thread has entered into a hang condition (as it is still processing messages) and subsequently causes the browser to enter the mitigation state.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1A:
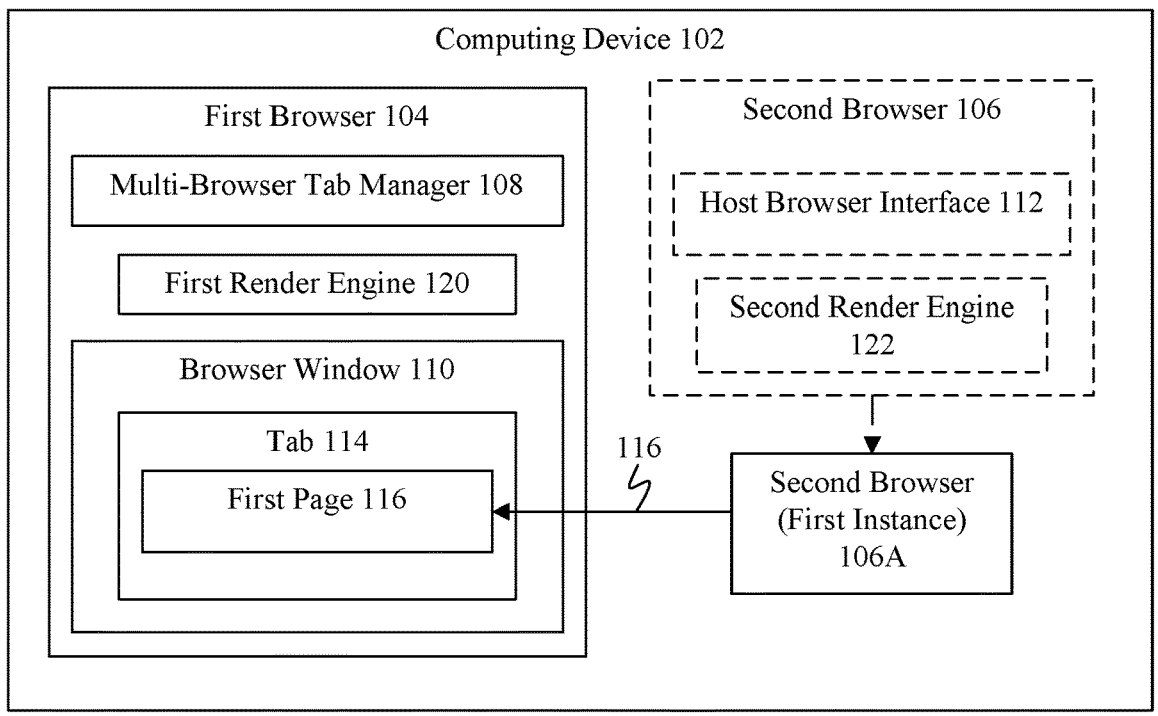
FIG. 1A and FIG. 1B show block diagrams of a system for managing page compatibility between a first (primary) browser and a second (secondary) browser in a computing device, according to an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

As described above, as web browsers have progressed over the years, enterprises have developed content that takes advantage of the increasing capability of the advancing web browsers as well as the capabilities of new web browsers. In some cases, content, such as a web application, developed for a particular web browser type and/or browser version has not been updated to be compatible with more modern web browsers and/or browser versions. Accordingly, such content may be incompatible with newer web browsers and/or browser versions, and thus is forced to be run in less advanced browser types and/or versions. This is inconvenient for users who are forced to maintain old versions of web browsers so that the content incompatible with more recent browser technology can continue to be accessed.

In the case of a web application, a potential solution to this problem is that the web application be given dual solutions, meaning that multiple versions of the web application are developed and maintained (e.g., for each browser type/version of interest). However, such an approach can consume resources and time. Furthermore, users would need to know which browser version is compatible with which web application. Another solution introduced the notion of auto-switching, where web applications would switch between web browsers based on a specification format that allowed administrators to specify a list of web app sites and the compatible browsers. However, this solution is visible to the user and very distracting. Another solution is introducing the notion of invoking a new browser window for a browser compatible with a web app from an open browser window for an incompatible browser in which the web app was attempted to be opened. While this may be an improvement over other solutions, it has shortfalls including the need to switch between browsers.

Embodiments described herein help address these and other issues related to content compatibility with web browsers. Embodiments described herein enable an integrated approach to running web applications with various compatibilities that do not require third-party extensions or sacrifice user experience. In embodiments, when a page of an application incompatible with a first web browser is to be executed, an instance of a second web browser with which the page is compatible is separately invoked and/or executed without opening a window for that second browser. Instead, the second browser opens a page within the window of the first browser. This enables an effective and efficient user experience by enabling the running of different web applications that have different web browser compatibilities in a same browser window.

As described above, certain third-party code may cause a window or tab of a browser to hang or freeze. This issue may be propagated to other windows or tabs of both the first browser and the second browser. Embodiments described herein detect when a particular window or tab of a browser is hanging and may cause the browser to enter into a mitigation state that mitigates the effect of the hang condition. For instance, a window or tab may execute via a first thread of the browser, and the third-party code may execute via a second thread of the browser. The first thread may be configured to issue a hang resistance message to the second thread and wait for a response for the message from the second thread. The second thread may be configured to process the hang resistance message after processing all other messages in its queue. Thus, if the first thread receives the response, the first thread determines that the second thread has not entered into a hang condition. However, if the first thread does not receive the response (e.g., within a predetermined time period), the first thread determines that the second thread has entered into a hang condition (as it is still processing messages) and subsequently causes the browser to enter the mitigation state.

The foregoing techniques advantageously provide improvements to a technical field; in particular, browser applications. For instance, when a particular window or tab enters into a hang condition, the user is still enabled to provide certain input with respect to the browser via the mitigation state and utilize features of the browser. For instance, a user may be able to switch to another tab that that is not hanging, reload the hanging tab (e.g., by interacting with a "refresh" button in the menu bar of the browser application), launch a new tab or window and continue to utilize the browser using that new tab or window (while the underlying thread for the hanging tab or window continues to process messages). The browser application may also enable the user to perform certain touch-based user input with respect to the hanging tab or window. For instance, the user may be enabled to zoom in or out (via a pinch-to-zoom movement) or pan in a certain direction by using a swipe movement. Accordingly, the user is still able to use the browser application to load and/or view Web content, whereas prior techniques force the user to completely shut down and relaunch the browser application.

Figure 1B:
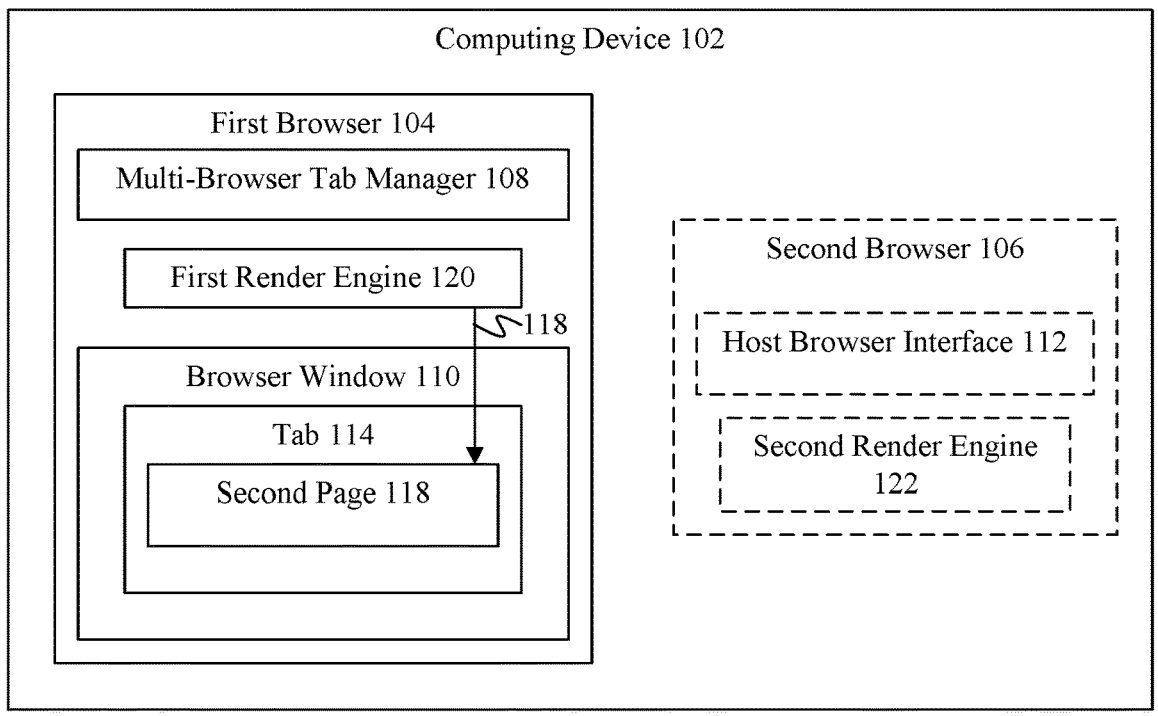

Such embodiments may be implemented in various ways. For instance, FIG. 1A and FIG. 1B show block diagrams of a system 100 for managing page compatibility between a first (primary) browser 104 and a second (secondary) browser 106, according to an example embodiment. As shown in FIG. 1A and FIG. 1B, system 100 includes a computing device 102 that includes first browser 104 and a second browser 106. First browser 104 includes a first render engine 120 and a multi-browser tab manager 108, and has an open browser window 110. Second browser 106 includes a second render engine 122 and a host browser interface 112. In FIG. 1A, second browser 106 has invoked a running instance (or process) of itself, referred to as second browser (first instance) 106A. Furthermore, browser window 110 includes a tab 114 displaying a first page 116 that is rendered by second render engine 122 of second browser (first instance) 106A. In FIG. 1B, no instance of second browser 106 executes. Instead, tab 114 displays a second page 118 rendered by first render engine 120 of first browser 104. FIGS. 1A and 1B are further described as follows.

Computing device 102 is a computing device via which a user is enabled to run applications and visit web pages compatible with various web browsers. Computing device 102 may be any type of mobile computing device, such as a Microsoft® Surface® device, a personal digital assistant (PDA), a laptop computer, a notebook computer, a tablet computer such as an Apple® iPad™, a netbook, a smart phone (such as an Apple® iPhone®, a phone implementing the Google® Android™ operating system, etc.), a wearable computing device (e.g., a head-mounted device including smart glasses such as Google® Glass™, a virtual headset such as Oculus Rift® by Oculus VR, LLC or HoloLens® by Microsoft Corporation, etc.), a stationary computing device such as a desktop computer or PC (personal computer), or other browser-enabled device.

First browser 104 and second browser 106 are web browsers, which are software applications configured for accessing information on the World Wide Web. For instance, first browser 104 and second browser 106 may be configured to receive links to web pages, to retrieve the web pages at the addresses indicated by the links, and to render pages for display to a user of computing device 102. Examples of first browser 104 and second browser 106 include Internet Explorer® or Microsoft Edge®, both developed by Microsoft Corp. of Redmond, Wash., Mozilla Firefox®, developed by Mozilla Corp. of Mountain View, Calif., Safari®, developed by Apple® Inc. of Cupertino, Calif., and Google® Chrome™ developed by Google Inc. of Mountain View, Calif. In embodiments, first and second browsers 104 and 106 are different from each other. For instance, first and second browsers 104 and 106 may be different web browser types (e.g., Google® Chrome™ and Microsoft Edge®). Alternatively, first and second browsers 104 and 106 may be different versions of a same web browser.

First render engine 120 and second render engine 122 of first browser 104 and second browser 106, respectively, are each configured to generate a display of content in browser tabs of browser windows, including transforming HTML (hypertext markup language) documents and other resources of a web page into an interactive visual representation. In an embodiment, each of first and second engines 120 and 122 may be configured to perform page layout and rendering of content. Examples of browser engines include Gecko™ used in the Mozilla Firefox® web browser, the WebKit™ engine used by the Apple® Safari® browser, and Blink™ used in the Google Chrome and Microsoft Edge Browsers.

Note that second browser 106 shown in dotted line represents the executable file(s) for second browser 106 that may be invoked to generate executing instances (or processes) of second browser 106, such as second browser (first instance) 106A shown in FIG. 1A. It is noted that executing instances of second browser 106 do include host browser interface 112 and second render engine 122, even though they are not shown illustrated in such instances for reasons of brevity.

As described above, web pages may be compatible with some browsers but not others. For instance, first page 116 may be compatible with second browser 106 but not compatible with first browser 104. In such case, an instance of second browser 106, such as second browser (first instance) 106A of FIG. 1A, may be invoked to render first page 116 within browser window 110 of first browser 104. In this way, pages compatible with second browser 106, but not with first browser 104, may still be displayed to users within first browser 104 without opening a separate browser window for second browser 106, thus providing an improved user experience. This may be accomplished in various ways.

In particular, first browser 104 includes multi-browser tab manager 108. Multi-browser tab manager 108 is configured to receive navigation requests to pages of web applications and determine whether a page to which such a request is directed is compatible with second browser 106 but not first browser 104, such as by conferring with a browser compatibility list. The browser compatibility list may list particular items of content, web applications, file extensions, and/or other identifiers for content that second browser 106 is compatible with (e.g., is capable of rendering) and that first browser 104 is not compatible with. If multi-browser tab manager 108 determines that a requested page is compatible with first browser 104 (e.g., is not identified in the browser compatibility list as incompatible with first browser 104), then first browser 104 receives the web address and renders the page within first browser 104 as normal. Alternatively, if multi-browser tab manager 108 determines that the page is compatible with second browser 106, but not first browser 104 (e.g., is identified in the browser compatibility list as compatible with second browser 106 but incompatible with first browser 104), then second browser (first instance) 106A is invoked to receive the web address of the page and to render the page within first browser 104.

Note that when second browser (first instance) 106A is invoked, second browser (first instance) 106A does not open a browser window as normally would occur. Instead, such a browser window opening is suppressed. For instance, an interface of multi-browser tab manager 108, such an API (application programming interface), may send an invocation request (e.g., as an API call) to second browser 106 through an API of second browser 106. The invocation request may include a parameter specifying that second browser (first instance) 106A does not open a browser window, but instead instructing second browser (first instance) 106A to direct any rendering information for a page to first browser 104, so the page may be opened in the open tab of first browser 104 in which the initial navigation request was received.

Likewise, host browser interface 112 of second browser (first instance) 106A is configured to receive navigation requests inside pages opened by second browser (first instance) 106A in tab 114, and determine whether pages to which such requests are directed are compatible with second browser 106 but not first browser 104. For instance, host browser interface 112 may confer with a browser compatibility list to make the determination. The browser compatibility list accessed by host browser interface 112 may be the same page compatibility used by multi-browser tab manager 108 or a different one. Upon determination that a page is compatible with second browser 106 and not first browser 104, host browser interface 112 renders the page hosted within tab 114 of first browser 104, again without opening a browser window for second browser (first instance) 106A.

For instance, as shown in FIG. 1A, first page 116 was determined to be compatible with second browser 106, but not first browser 104. As such, browser window 110 of first browser 104 displays first page 116 within tab 114, rendered there by second render engine 122 of second browser (first instance) 106A. Alternatively, as shown in FIG. 1B, a second page 118 (opened from a link within first page 116, or by a history navigation) was determined to be compatible with first browser 104. As such, browser window 110 displays second page 118 within tab 114, rendered there by first render engine 120. In the case of FIG. 1B, because second page 118 is compatible with first browser 104, second browser (first instance) 106A is not needed and may therefore be closed, thereby freeing up memory and reducing processor demand in computing device 102.

Accordingly, pages may be opened in tab 114 by first browser 104 or instances of second browser 106, depending on browser capability for the pages, in any page sequence. Such embodiments are described in further detail in the following subsections.

A. Example Embodiments for Detecting Hang Conditions in a Browser Application

In certain cases, third-party code (e.g., JavaScript, ActiveX controls, plugins, etc.)

executing in one or more threads of second browser (first instance) 106A may cause a hang condition, which makes both second browser (first instance) 106A and first browser 104 appear to freeze or be unresponsive. During such a condition, the user is typically no longer able to provide user input. The embodiments described herein provide hang condition detection and perform mitigation techniques to mitigate the effects of the hang condition.

Figure 2:
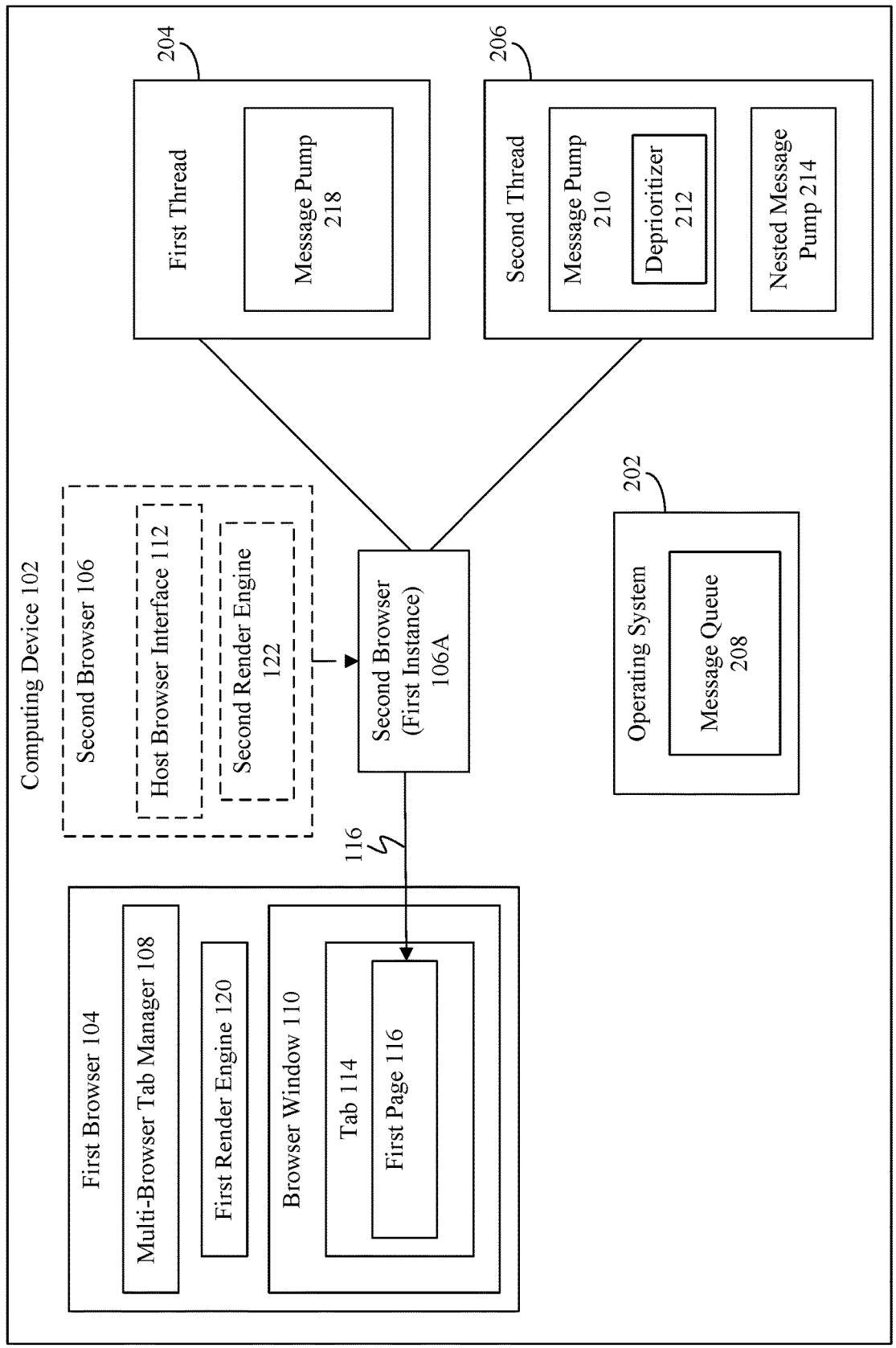
FIG. 2 shows a block diagram of a system for detecting a hang condition with respect to a browser application in accordance with an example embodiment.

For instance, FIG. 2 shows a block diagram of a system 200 for detecting a hang condition for second browser (first instance) 106A in accordance with an example embodiment. As shown in FIG. 2, computing device 102 further includes an operating system 202, a first thread 204, and a second thread 206. Operating system 202 may manage one or more hardware components (e.g., processor(s), main memory, secondary storage device(s), etc.) and software (e.g., browsers) executing on computer system 100. In accordance with an embodiment, second browser 106 is integrated into and considered to be a component of operating system 202.

One or more threads may run in the context of second browser (first instance) 106A. For instance, as shown in FIG. 2, a first thread 204 and a second thread 206 may run in the context of a second browser (first instance) 106A. As defined herein, a thread is the basic unit (a sequence of program instructions/code) to which operating system 202 allocates processor time. Each of first thread 204 and second thread 206 may execute any part of code associated with browser instance 106 (second instance). In the example shown in FIG. 2, first thread 204 is a browser window thread (e.g., associated with browser window 110), which is configured to process window events, receive user input, etc. Second thread 206 is a content thread, which is configured to execute third-party code associated with a Web page displayed via browser window 110.

As further shown in FIG. 2, operating system 202 may comprise a message queue 208. Message queue 208 is configured to temporarily store messages posted by first thread 204 and/or second thread 206. In an embodiment in which operating system 202 is Microsoft Windows®, messages may be posted to message queue 208 via a postMessage( ) function. A first type of messages stored in message queue 208 may be the result of user input entered via an input device (e.g., a mouse, a keyboard, a touchscreen, a stylus, etc.). For instance, whenever a user moves a mouse, clicks a mouse button, types on a keyboard, etc., a device driver for the corresponding input device converts the input into messages and places them in message queue 208. A second type of messages stored in message queue 208 is not based on user input. Such messages may be issued by operating system 202, first browser 104, second browser 106, first thread 204, and/or second thread 206.

Messages stored in message queue 208 may be removed (or dequeued) by first thread 204 and/or second thread 206. For instance, first thread 204 may comprise a message pump 218, and second thread 208 may comprise a message pump 210. Each of message pump 218 and message pump 210 may also be referred to as message loops. Each of message pump 218 and message pump 210 may be configured to dequeue messages and dispatch messages to an appropriate window procedure (of a window or tab to which a respective thread is associated) for processing. In accordance with an embodiment in which operating system 202 is Microsoft Windows®, each of message pump 218 and message pump 210 may dequeue a message utilizing a GetMessage( ) function and may dispatch messages using a DispatchMessage( ) function.

The second type of messages may have a higher priority than user input-based messages. Moreover, such messages may cause other messages to be queued on message queue 208, which are to be processed before the user input-based messages. In such a scenario, the processing of user input-based messages may be significantly delayed. This causes second browser (first instance) 106A to experience a hang condition (i.e., second browser (first instance) 106A is not responsive to user input)). Moreover, the unresponsiveness may further spread to first browser 104, for example, when a user attempts to a view another Web page being rendered by first browser 104.

Certain techniques for detecting a hang condition comprise first thread 204 queuing a hang resistance message in message queue 208 (e.g., via a PostMessage( ) function). A tab object of first thread 204 may queue the hang resistance message. The hang resistance message may also have a higher priority than the user input-based messages. When second thread 206 dequeues the hang resistance message, second thread 206 sends a response to first thread 204 to indicate that the hang resistance message has been processed. Upon receiving the response, first thread 204 may determine that second thread 206 is not in a hang condition due to its ability to process the hang resistance message. However, because the hang resistance message has a higher priority than the user input-based messages, second thread 206 processes the hang resistance message before the user input-based messages. In the case where the second type of messages cause other messages to be queued, the processing of user-input based messages is still significantly delayed. Accordingly, the processing of the hang resistance message by second thread 206 in this scenario provides a false positive to first thread 204. Accordingly, the hang condition is not properly detected and the mitigation techniques to mitigate the effects of the hang condition may not be initiated.

To properly detect a hang condition, message pump 210 may include a deprioritizer 212. Deprioritizer 212 may be configured to dequeue hang resistance messages when no other messages are queued in message queue 208. In this way, message pump 210 will process hang resistance messages after the user-input based messages are processed by second thread 206. If second thread 206 does not provide a response to the hang resistance message within a predetermined time period, first thread 204 may determine that second thread 206 is in a hang condition and enter a mitigation state to mitigate the effects of the hang condition.

In certain situations, a hang resistance message may be dequeued from message queue 208 by a message pump maintained by third-party code, after message pump 210 has already dequeued a second type of message. Such a message pump may be referred to as a nested message pump (shown as nested message pump 214), and message pump 210 may be referred to as a root message pump. For instance, suppose message pump 210 dequeues a second type of message. The message may be associated with third-party code, which causes nested message pump 214 to execute. Nested message pump 214 becomes the currently-active message pump (i.e., message pump 210 will not dequeue any more messages until nested message pump 214 has completed execution). Further suppose the next message in the message queue 208 is a hang resistance message. Because nested message pump 214 is the currently-active message pump, nested message pump 214 dequeues the hang resistance message and dispatches it to the appropriate window procedure. Deprioritizer 212 is not included in nested message pump 214, as nested message pump 214 is maintained by a third party. Accordingly, nested message pump 214 will process the hang resistance message regardless of whether message queue 208 stores user input-based messages. However, the window procedure to which hang resistance message is dispatched may indicate to message pump 210 that the hang resistance message is still pending. Deprioritizer 212 may process the hang resistance message when no other messages are stored in message queue 208.

Nested message pump 214 may process many messages in message queue 208 before control is returned to message pump 210. Accordingly, a significant amount of time may pass before user-input based messages are processed by message pump 210. This may be perceived as a hang condition, even though nested message pump 214 is still successfully processing messages. Accordingly, entering the mitigation state in such a scenario would be unnecessary. To prevent second browser (first instance) 106A from unnecessarily entering the mitigation state, first thread 204 may determine whether second thread 206 is utilizing nested message pump 214. For instance, after the first predetermined period of time has expired after first thread 204 issues the hang resistance message, first thread 204 may issue a nested pump query message to the browser window on second thread 206. A tab object of first thread 204 may issue the nested pump query message. If nested message pump 214 is being utilized, the nested pump query message is handled by the window procedure of the browser window on second thread 206. In response, second thread 206 sends a message response to first thread 204 that indicates that nested message pump 214 is being utilized. In response, first thread 204 does not cause the mitigation state to be entered and continues to periodically poll second thread 206 with the nested pump query message.

However, if nested message pump 214 is not being utilized, message pump 210 may handle the nested message pump query message and may provide a message response to first thread 204 that indicates that nested message pump 214 is not being utilized (and/or that message pump 210 is being utilized). The message response may be posted to message queue 208 (e.g., via a PostMessage( ) function). Message pump 218 of first thread 204 may dequeue the message response from message queue 208 and process the message response to determine that nested message pump 214 is not being utilized.

Responsive to the message response indicating that nested message pump 214 is not being utilized or responsive to determining that the message response has not been received within a predetermined period of time, first thread 204 may determine that second thread 206 is in a hang condition and cause second browser (first instance) 106A to enter a mitigation state. Additional details regarding the mitigation techniques performed when in the mitigation state are described below in Subsection B.

Figure 3:
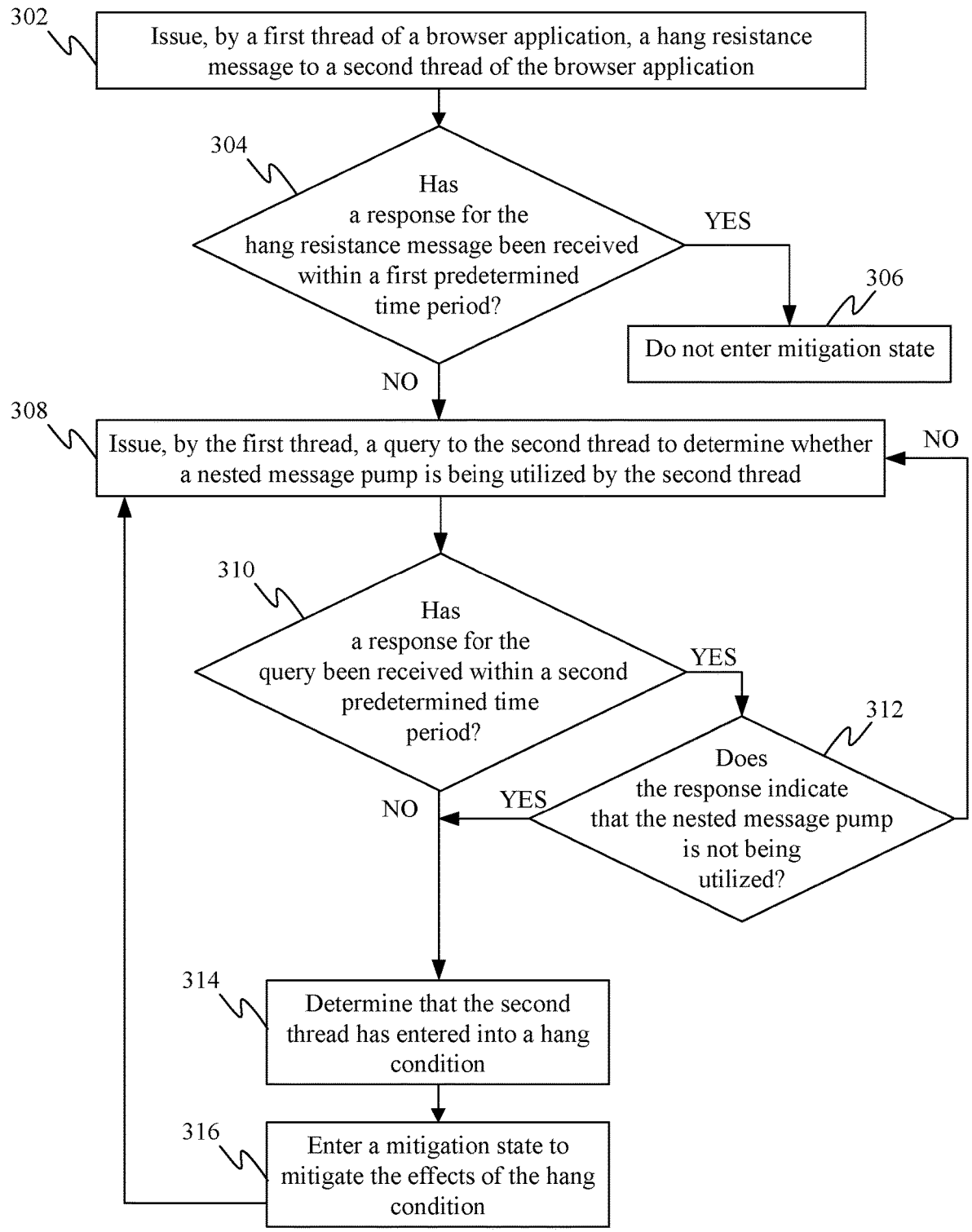
FIG. 3 shows a flowchart of a method for detecting a hang condition with respect to a browser application and causing the browser application to enter into a mitigation state in accordance with an example embodiment.
Figure 4A:
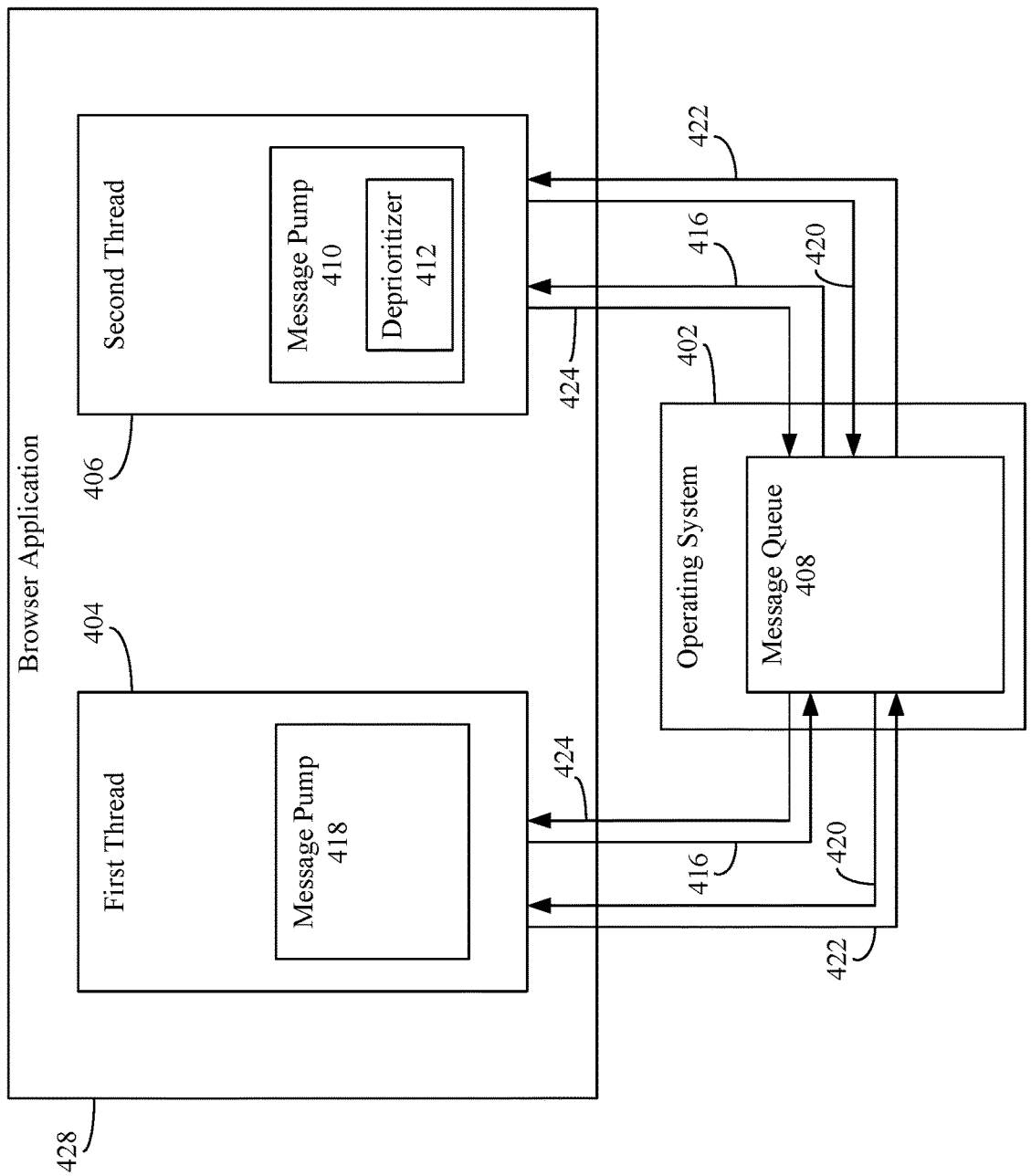
FIG. 4A and FIG. 4B show block diagram views of a system for detecting a hang condition with respect to a browser application and causing the browser to enter into a mitigation state in accordance with an example embodiment.
Figure 4B:
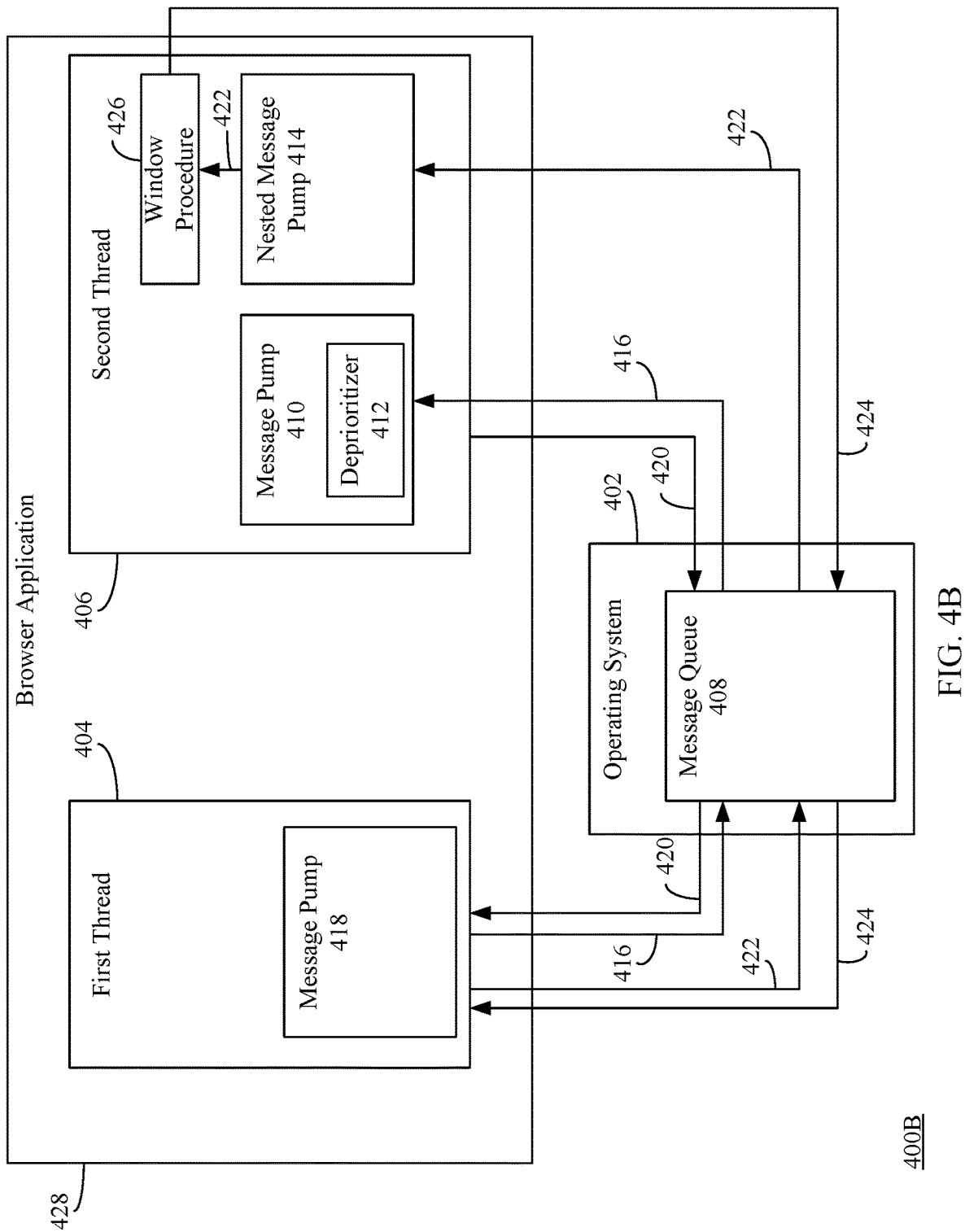

Accordingly, first thread 204 may be configured to detect a hang condition with respect to another thread of a browser application and cause the browser application to enter into a mitigation state in various ways. For instance, FIG. 3 shows a flowchart 300 of a method for detecting a hang condition with respect to a browser application and causing the browser application to enter into a mitigation state in accordance with an example embodiment. In an embodiment, flowchart 300 may be implemented by a system 400 shown in FIGS. 4A and 4B, although the method is not limited to that implementation. FIGS. 4A and 4B show a block diagram of a system 400 for detecting a hang condition with respect to a browser application 428 and causing browser application 428 to enter into a mitigation state in accordance with an example embodiment. As shown in FIGS. 4A and 4B, system 400 comprises browser application 428 and an operating system 402. Browser application 428 and operating system 402 are examples of second browser (first instance) 106A and operating system 202, respectively, as shown in FIG. 2. As also shown in FIGS. 4A and 4B, browser application 428 has invoked a first thread 404 and a second thread 406, which are examples of first thread 204 and second thread 206, as described above with reference to FIG. 2. As further shown in FIG. 4, operating system 402 comprises a message queue 408, which is an example of message queue 208, first thread 404 comprises a message pump 418, and second thread 406 comprises a message pump 410. Message pump 410 further comprises a deprioritizer 412. Message pump 418, message pump 410, and deprioritizer 412 are examples of message pump 218, message pump 210, and deprioritizer 212, respectively, as described above with reference to FIG. 2. Other structural and operational embodiments will be apparent to persons skilled in the relevant art(s) based on the discussion regarding flowchart 300 and system 400 of FIGS. 4A and 4B.

Flowchart 300 of FIG. 3 begins with step 302. In step 302, a hang resistance message is issued, by a first thread of a browser application, to a second thread of the browser application. For example, with reference to FIG. 4A, first thread 404 may issue a hang resistance message 416 (e.g., by using a PostMessage( ) function) to message queue 408. Message pump 410 of second thread 406 may dequeue hang resistance message 416 (e.g., by using a GetMessage( ) function).

In accordance with one or more embodiments, the first thread is a browser window thread, and the second thread is a content thread. For example, with reference to FIG. 4A, first thread 404 is a browser window thread, and second thread 406 is a content thread.

In accordance with one or more embodiments, the browser application is invoked from a different browser application. For example, with reference to FIG. 4A, browser application 428 may be invoked by another browser application (e.g., first browser 104), as described above with reference to FIGS. 1A and 1B.

In accordance with one or more embodiments, the hang resistance message is stored in a message queue associated with the second thread. The root message pump associated with the second thread is configured to dequeue the hang resistance message when no other messages are stored in the message queue. For example, with reference to FIG. 4A, hang resistance message 416 is stored in message queue 408. Deprioritizer 412 of message pump 410 is configured to dequeue resistance message 416 when no other messages are stored in message queue 408. This ensures that hang resistance message 416 will be processed by second thread 406 when all other messages (in particular, user input-based messages) stored in message queue 408 are processed.

In step 304, a determination is made by the first thread as to whether a response for the hang resistance message has been received from the second thread within a first predetermined time period. For instance, with reference to FIGS. 4A and 4B, first thread 404 determines whether second thread 406 provides a response for the hang resistance message. If a determination is made that the response has been received, flow continues to step 306. Otherwise, flow continues to 308.

At step 306, the mitigation state is not entered, as no hang condition exists. For example, with reference to FIG. 4A, first thread 404 determines that second thread 406 is responsive and does not cause browser application 428 to enter the mitigation state. Additional details regarding how first thread 404 determines that second thread 406 is responsive is described below with reference to FIG. 5.

At step 308, a query is issued, by the first thread, to the second thread to determine whether a nested message pump is being utilized by the second thread. For example, with reference to FIG. 4A, first thread 402 may issue a query 422 to message queue 408. As shown in FIG. 4A, if no nested message pump is being utilized, message pump 410 may dequeue query 422. As shown in FIG. 4B, if nested message pump 414 is being utilized, nested message pump 414 dequeues query 422.

At step 310, a determination is made as to whether a response to the query has been received within a second predetermined time period. For example, with reference to FIG. 4A, first thread 404 may determine whether a response 424 to query 422 has been received within a second predetermined time period. If a determination is made that response 424 was received within the second predetermined time period, flow continues to step 312. Otherwise, flow continues to step 314.

As shown in FIG. 4A, if no nested message pump is being utilized, second thread 206 may post response 424 in message queue 408, and message pump 418 may be configured to dequeue response 424. Response 424 may indicate that no nested message pump is being utilized. As shown in FIG. 4B, if nested message pump 414 is being utilized, nested message pump 414 dispatches query 422 to a window procedure 426 of second thread 406, and window procedure 426 provides response 424 that indicates that nested message pump 414 is being utilized. For example, window procedure 426 may post query 424 to message queue 408, and message pump 418 dequeues query 424.

At step 312, a determination is made as to whether the response indicates that the nested message pump is not being utilized. For example, with reference to FIGS. 4A and 4B, first thread 404 may determine whether response 424 indicates that nested message pump 414 is not being utilized. If a determination is made that response 424 indicates that nested message pump 414 is not being utilized, flow continues to step 314. Otherwise, flow continues to step 308, where query 422 is reissued. For example, with reference to FIG. 4A, if response 424 indicates that no nested message pump is being utilized, flow continues to step 314. With reference to FIG. 4B, if response 424 indicates that nested message pump 414 is being utilized, flow continues to step 308, where first thread 404 determines that second thread 406 is not in a hang condition and gives nested message pump 414 the opportunity to finish processing messages in message queue 408.

At step 314, a determination is made that the second thread has entered into a hang condition. For example, with reference to FIG. 4A, first thread 404 determines that second thread 406 has entered into a hang condition because either first thread 404 has not received response 424 or response 424 indicates that a nested message pump is not being utilized (i.e., message pump 410 is being utilized but second thread 406 has not provided a response (shown as response 420) to hang resistance message 416).

At step 316, a mitigation state is entered to mitigate the effects of the hang condition. For example, with reference to FIGS. 4A and 4B, first thread 404 may cause browser application 428 to enter a mitigation state. While in the mitigation state, first thread 404 may periodically issue query 422 to second thread 406 via step 308 to re-evaluate whether a nested message pump (e.g., nested message pump 414) is being utilized by second thread 406. First thread 404 may continue to periodically issue query 422 until response 420 to hang resistance message 416 is received, at which point the mitigation state is left and first thread 404 resumes normal operation. It is noted that the mitigation state may also be left if, during re-evaluation of whether nested message pump 414 is being utilized, it is determined that response 424 indicates that nested message pump 414 is still being utilized (i.e., the "NO" condition for step 312 is true).

In accordance with one or more embodiments, the mitigation state enables the user to interact with one or more user interface elements of the browser application while the second thread is in the hang condition. For example, with reference to FIGS. 4A and 4B, browser application 428, when in the mitigation state, enables the user to interact with user interface element(s) of browser application 428 while second thread 406 is in the hang condition. Additional details regarding the mitigation state is described below in Subsection B.

Figure 5:
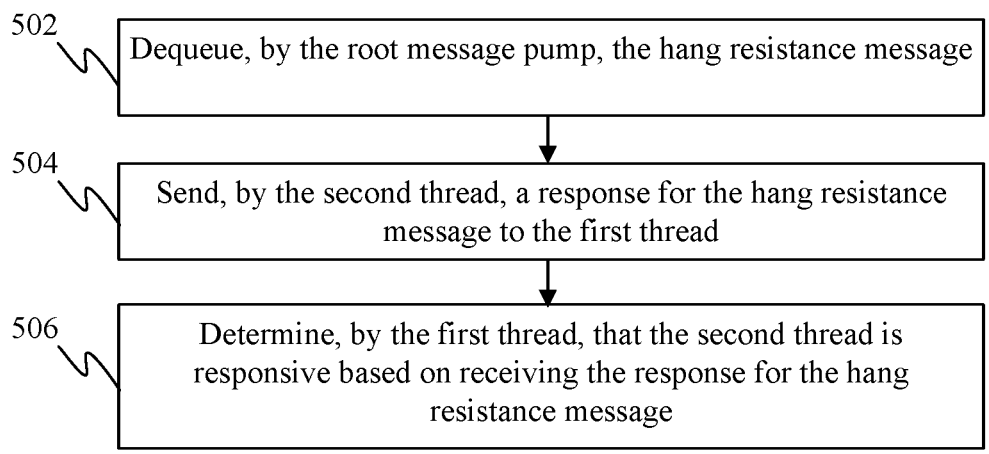
FIG. 5 shows a flowchart of a method for determining that a thread is responsive in accordance with an example embodiment.

FIG. 5 shows a flowchart 500 of a method for determining that a thread is responsive in accordance with an example embodiment. In an embodiment, flowchart 500 may be implemented by system 400 shown in FIG. 4A, although the method is not limited to that implementation. Accordingly, FIG. 5 will be described with continued reference to FIG. 4A. Other structural and operational embodiments will be apparent to persons skilled in the relevant art(s) based on the discussion regarding flowchart 500 and system 400 of FIG. 4A.

Flowchart 500 of FIG. 3 begins with step 502. In step 502, the root message pump dequeues the hang resistance message. For example, with reference to FIG. 4A, if deprioritizer 412 determines that no other messages are queued in message queue 408, message pump 410 may dequeue hang resistance message 416.

In step 504, the second thread sends a response for the hang resistance message to the first thread. For example, with reference to FIG. 4A, second thread 406 may send response 420 to first thread 404 that indicates that hang resistance message 416 was processed by second thread 406. For instance, second thread 406 may post response 420 to message queue 408, and message pump 418 may dequeue response 420 from message queue 420.

In step 506, the first thread determines that the second thread is responsive based on receiving the response for the hang resistance message. For example, with reference to FIG. 4A, responsive to receiving response 420, first thread 404 determines that second thread 406 is responsive and does not cause browser application 428 to enter the mitigation state.

B. Embodiments for Mitigating the Effects of a Hang Condition

Once a thread determines that another thread has entered into a hang condition, the thread may cause the browser application to enter a mitigation state. Once in the mitigation state, the browser application enables the user to interact with certain user interface elements of the browser application. For instance, a user may be able to switch to another tab that that is not hanging, reload the hanging tab (e.g., by interacting with a "refresh" button in the menu bar of the browser application), launch a new tab or window and continue to utilize browser using that new tab or window (while the underlying thread for the hanging tab or window continues to process messages in the message queue until it finally process user input-based messages). The browser application may also enable the user to perform certain touch-based user input with respect to the hanging tab or window. For instance, the user may be enabled to zoom in or out (via a pinch-to-zoom movement) or pan in a certain direction by using a swipe movement.

Figure 6:
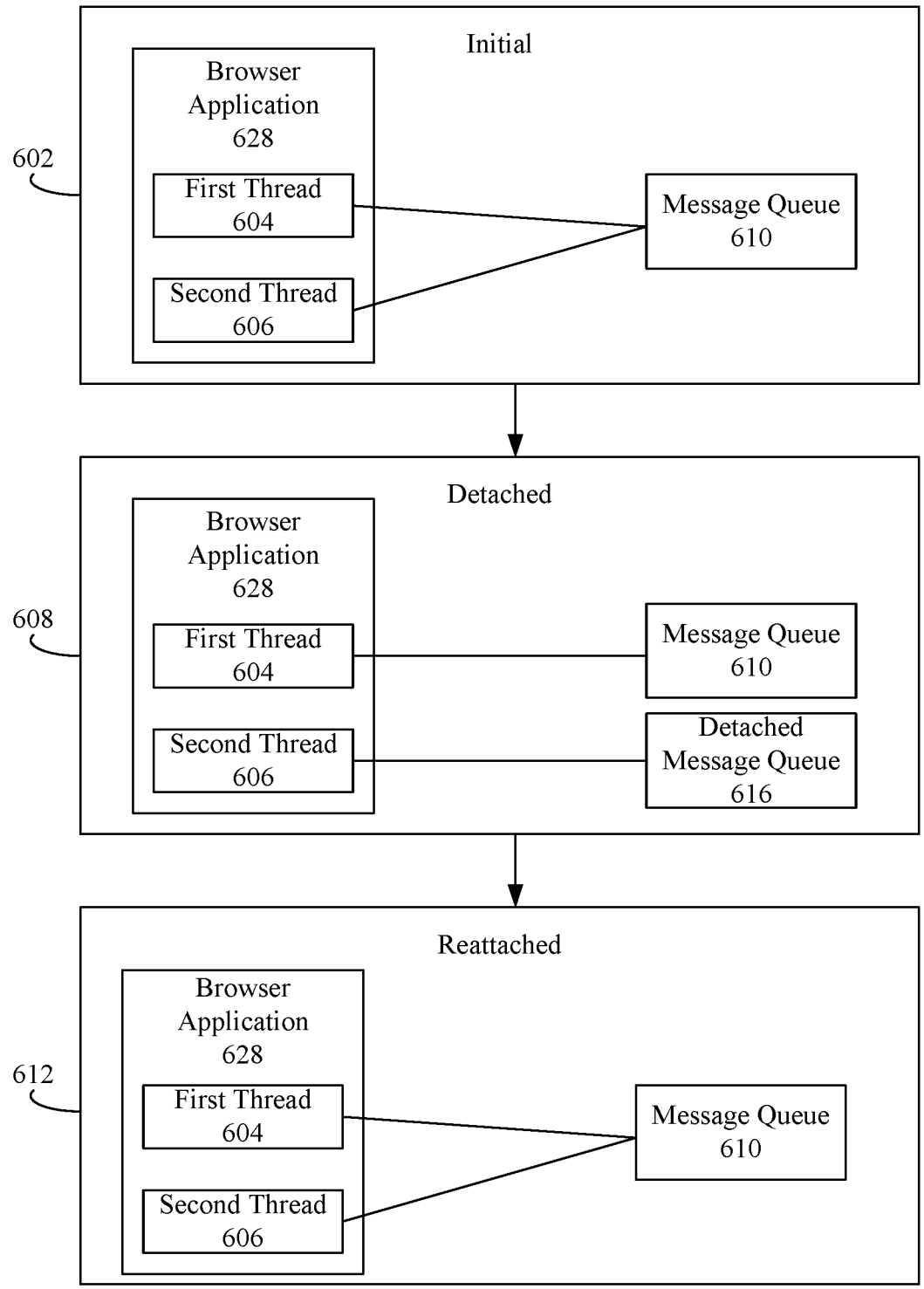
FIG. 6 is a block diagram illustrating techniques for detaching a message queue in accordance with an example embodiment

In accordance with an embodiment, the foregoing may be achieved by detaching a message queue utilized by the threads. For example, FIG. 6 is a block diagram illustrating techniques for detaching a message queue in accordance with an embodiment. In particular, FIG. 6 represents transitions between different states associated with a message queue 610. Message queue 610 is an example of message queue 410, as described above with reference to FIGS. 4A and 4B.

At state 602, browser application 628 has invoked a first thread 604 and a second thread 606, each of which being configured to utilize message queue 610. First thread 604, second thread 606, and browser application 628 are examples of first thread 404, second thread 406, and browser application 428, as described above with reference to FIGS. 4A and 4B.

When first thread 604 determines that second thread 606 has entered into a hang condition (as described above in Subsection A), first thread 604 may cause second thread 606 to be detached from the message queue 610.

In particular, second thread 606 can be detached as represented by detached state 608 in FIG. 6. As depicted, a detached message queue 616 can be associated with second thread 606 and can be employed to manage messaging for second thread 606. First thread 604 may continue to use the message queue 610. Thus, messages for a second thread 606 may be handled by a detached message queue 616. Message queue 610 may continue to process messages for first thread 604 and/or other responsive threads so that browser application 628 does not become unresponsive due to a disruption caused by second thread 606.

When first thread 604 determines that responsiveness has been restored to detached second thread 606, first thread 604 may respond by causing second thread 606 to be reattached to message queue 610. For example, assume that second thread 606 is detached as described above for a period of time and then becomes responsive once again. First thread 604 may detect that second thread 606 is responsive once again (e.g., by returning a response to hang resistance message 416). In response to the detection, first thread 604 may operate to reattach second thread 606.

In particular, second thread 606 may be reattached as represented by reattached state 612 in FIG. 6. As depicted, detached message queue 616 is deallocated. In reattached state 612, messaging for second thread 606 is again being handled by message queue 610. This can involve merging messages for second thread 606 back with messages for first thread 604 (and/or other responsive thread) in message queue 610. Additional details regarding message queue detachment techniques may be found in commonly-owned U.S. Pat. No. 8,667,505, issued Mar. 4, 2014, and entitled "Message Queue Management."

Another mitigation technique that may be utilized is assigning a new parent for the window or tab running on the hanging thread (e.g., second thread 606). For instance, when the responsive thread (e.g., first thread 604) detects that another thread is under a hang condition, the responsive thread may cause browser application 628 to change the parent window (e.g., the frame window running on first thread 604) of the tab/window that runs on the hanging thread (e.g., second thread 606). For instance, browser application 628 may generate a new, intermediate window (i.e., a frame tab window) that also runs on first thread 604. The intermediate window is unparented from the frame window, such that the frame tab window is no longer a child of the frame window. The tab/window that runs on the hanging thread is still a child of the frame tab window. In this way, the tab/window is no longer a descendant of the frame window. Thus, the hanging thread (i.e., second thread 606) will not cause the responsive thread (i.e., first thread 604) to hang.

In an embodiment in which browser application 628 is invoked and hosted by another browser (e.g., first browser 104, as shown in FIG. 1), the frame thread of second browser 628 is a child of the frame thread of first browser 104). When first thread 604 detects that second thread 606 is unresponsive, first thread 604 may cause the frame thread of second browser 628 to be parented by an alternate window on the frame thread of second browser 628 (rather than the frame thread of first browser 104). In this way, the hanging window or tab will not cause the frame thread of first browser 104 to hang.

III. Example Computer System Implementation

Computing device 102, first browser 104, second browser 106, second browser (first instance) 106A, multi-browser tab manager 108, first render engine 120, host browser interface 112, second render engine 122, first thread 204 second thread 206, operating system 202, message queue 208, message pump 218, message pump 210, deprioritizer 212, nested message pump 214, browser application 428, operating system 402, message queue 408, first thread 404, second thread 406, message pump 418, message pump 410, deprioritizer 412, nested message pump 414, window procedure 426, browser application 628, first thread 604, second thread 606, message queue 610, detached message queue 616, flowchart 300, and/or flowchart 500 may be implemented in hardware, or hardware combined with one or both of software and/or firmware. For example, computing device 102, first browser 104, second browser 106, second browser (first instance) 106A, multi-browser tab manager 108, first render engine 120, host browser interface 112, second render engine 122, first thread 204 second thread 206, operating system 202, message queue 208, message pump 218, message pump 210, deprioritizer 212, nested message pump 214, browser application 428, operating system 402, message queue 408, first thread 404, second thread 406, message pump 418, message pump 410, deprioritizer 412, nested message pump 414, window procedure 426, browser application 628, first thread 604, second thread 606, message queue 610, detached message queue 616, flowchart 300, and/or flowchart 500 may be implemented as computer program code/instructions configured to be executed in one or more processors and stored in a computer readable storage medium.

Alternatively, computing device 102, first browser 104, second browser 106, second browser (first instance) 106A, multi-browser tab manager 108, first render engine 120, host browser interface 112, second render engine 122, first thread 204 second thread 206, operating system 202, message queue 208, message pump 218, message pump 210, deprioritizer 212, nested message pump 214, browser application 428, operating system 402, message queue 408, first thread 404, second thread 406, message pump 418, message pump 410, deprioritizer 412, nested message pump 414, window procedure 426, browser application 628, first thread 604, second thread 606, message queue 610, detached message queue 616, flowchart 300, and/or flowchart 500 may be implemented as hardware logic/electrical circuitry.

For instance, in an embodiment, one or more, in any combination, of computing device 102, first browser 104, second browser 106, second browser (first instance) 106A, multi-browser tab manager 108, first render engine 120, host browser interface 112, second render engine 122, first thread 204 second thread 206, operating system 202, message queue 208, message pump 218, message pump 210, deprioritizer 212, nested message pump 214, browser application 428, operating system 402, message queue 408, first thread 404, second thread 406, message pump 418, message pump 410, deprioritizer 412, nested message pump 414, window procedure 426, browser application 628, first thread 604, second thread 606, message queue 610, detached message queue 616, flowchart 300, and/or flowchart 500 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 7:
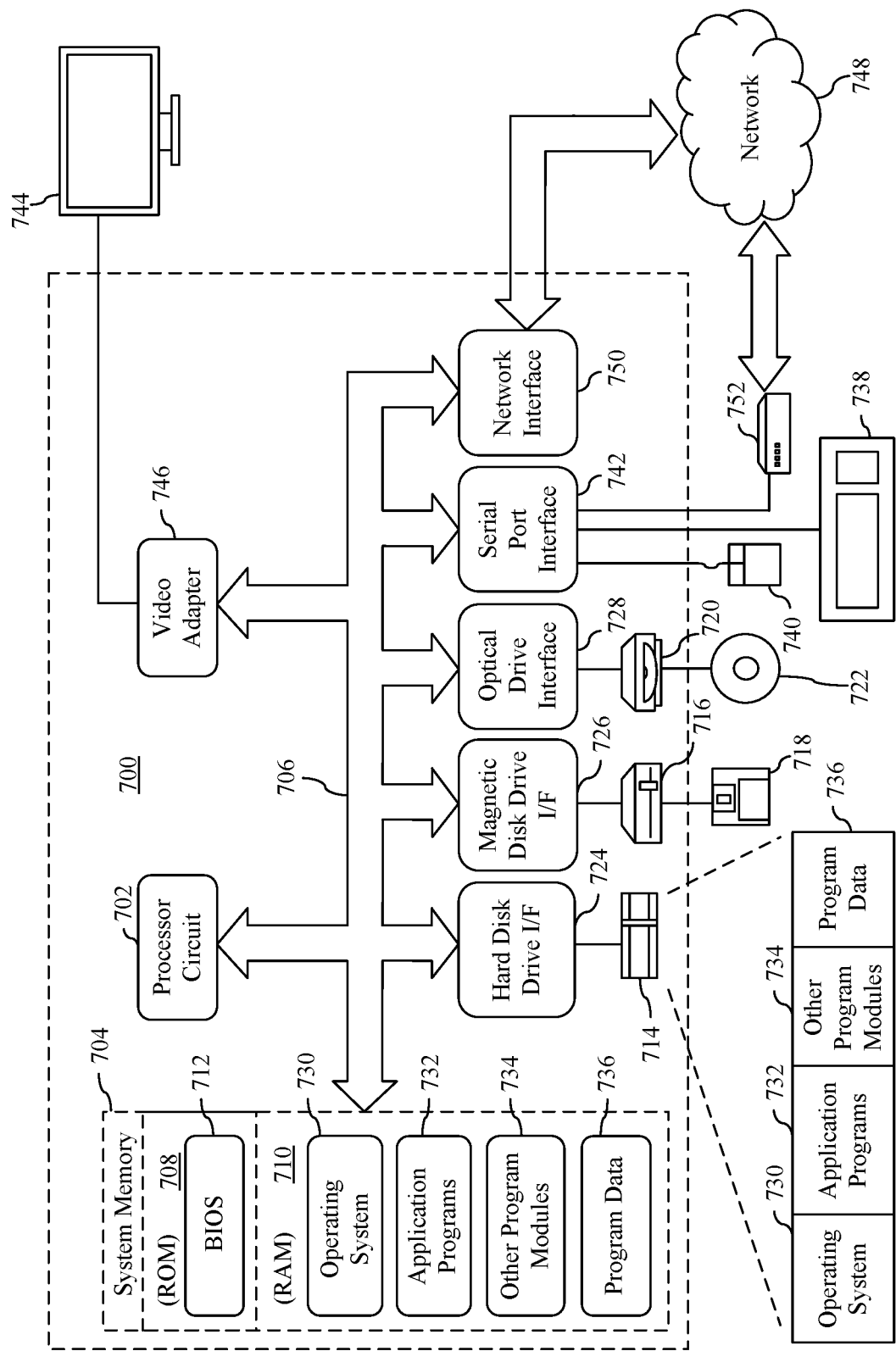
FIG. 7 is a block diagram of an example processor-based computer system that may be used to implement various embodiments.

FIG. 7 depicts an exemplary implementation of a computing device 700 in which embodiments may be implemented. For example, computing device 102 may be implemented in one or more computing devices similar to computing device 700 in stationary or mobile computer embodiments, including one or more features of computing device 700 and/or alternative features. The description of computing device 700 provided herein is provided for purposes of illustration, and is not intended to be limiting. Embodiments may be implemented in further types of computer systems, as would be known to persons skilled in the relevant art(s).

As shown in FIG. 7, computing device 700 includes one or more processors, referred to as processor circuit 702, a system memory 704, and a bus 706 that couples various system components including system memory 704 to processor circuit 702. Processor circuit 702 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 702 may execute program code stored in a computer readable medium, such as program code of operating system 730, application programs 732, other programs 734, etc. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random-access memory (RAM) 710. A basic input/output system 712 (BIOS) is stored in ROM 708.

Computing device 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 730, one or more application programs 732, other programs 734, and program data 736. Application programs 732 or other programs 734 may include, for example, computer program logic (e.g., computer program code or instructions) for implementing any of the features of computing device 102, first browser 104, second browser 106, second browser (first instance) 106A, multi-browser tab manager 108, first render engine 120, host browser interface 112, second render engine 122, first thread 204 second thread 206, operating system 202, message queue 208, message pump 218, message pump 210, deprioritizer 212, nested message pump 214, browser application 428, operating system 402, message queue 408, first thread 404, second thread 406, message pump 418, message pump 410, deprioritizer 412, nested message pump 414, window procedure 426, browser application 628, first thread 604, second thread 606, message queue 610, detached message queue 616, flowchart 300, and/or flowchart 500 (or any one or more steps of such flowcharts), and/or further embodiments described herein.

A user may enter commands and information into computing device 700 through input devices such as keyboard 738 and pointing device 740. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 702 through a serial port interface 742 that is coupled to bus 706, but may be connected by other interfaces, such as a parallel port, game port, or a universal serial bus (USB).

A display screen 744 is also connected to bus 706 via an interface, such as a video adapter 746. Display screen 744 may be external to, or incorporated in computing device 700. Display screen 744 may display information, as well as being a user interface for receiving user commands and/or other information (e.g., by touch, finger gestures, virtual keyboard, etc.). In addition to display screen 744, computing device 700 may include other peripheral output devices (not shown) such as speakers and printers.

Computing device 700 is connected to a network 748 (e.g., the Internet) through an adaptor or network interface 750, a modem 752, or other means for establishing communications over the network. Modem 752, which may be internal or external, may be connected to bus 706 via serial port interface 742, as shown in FIG. 7, or may be connected to bus 706 using another interface type, including a parallel interface.

As used herein, the terms "computer program medium," "computer-readable medium," and "computer-readable storage medium" are used to refer to physical hardware media such as the hard disk associated with hard disk drive 714, removable magnetic disk 718, removable optical disk 722, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media and propagating signals (do not include communication media or propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 732 and other programs 734) may be stored on the hard disk, magnetic disk, optical disk, ROM, RAM, or other hardware storage medium. Such computer programs may also be received via network interface 750, serial port interface 742, or any other interface type. Such computer programs, when executed or loaded by an application, enable computing device 700 to implement features of embodiments discussed herein. Accordingly, such computer programs represent controllers of the computing device 700.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Example Embodiments

A method is described herein. The method comprises: issuing, by a first thread of a browser application, a hang resistance message to a second thread of the browser application; determining, by the first thread, whether a response for the hang resistance message has been received from the second thread within a first predetermined time period; and in response to determining that the response has not been received within the first predetermined time period; issuing, by the first thread, a query to the second thread to determine whether a nested message pump is being utilized by the second thread; determining whether a response to the query has been received within a second predetermined time period; and in response to determining that: the response to the query has not been received within the second predetermined time period, or the response to determining that the response to the query has been received within the second predetermined time period and that the response to the query indicates that the nested message pump is not being utilized: determining that the second thread has entered into a hang condition; and entering a mitigation state to mitigate the effects of the hang condition.

In one embodiment of the foregoing method, the method further comprises in response to determining that the response to the query has been received within the second predetermined time period and in response to determining that the response to the query indicates that the nested message pump is being utilized by the second thread, reissuing, by the first thread, the query to the second thread.

In another embodiment of the foregoing method, the method further comprises storing the hang resistance message in a message queue associated with the second thread, wherein a root message pump of the second thread is configured to dequeue the hang resistance message when no other messages are stored in the message queue.

In another embodiment of the foregoing method, the method further comprises dequeuing, by the root message pump, the hang resistance message; sending, by the second thread, a response for the hang resistance message to the first thread; and determining, by the first thread, that the second thread is responsive based on receiving the response for the hang resistance message.

In another embodiment of the foregoing method, the first thread is a browser window thread, and wherein the second thread is a content thread.

In another embodiment of the foregoing method, said entering comprises: enabling the user to interact with one or more user interface elements of the browser application while the second thread is in the hang condition.

In another embodiment of the foregoing method, the browser application is invoked from a different browser application.

A system is also described herein. The system includes at least one processor circuit; and at least one memory that stores program code configured to be executed by the at least one processor circuit, the program code comprising: a first thread and a second thread of a browser application, the first thread configured to: issue a hang resistance message to a second thread of the browser application; determine whether a response for the hang resistance message has been received from the second thread within a first predetermined time period; and in response to a determination that the response has not been received within the first predetermined time period; issue a query to the second thread to determine whether a nested message pump is being utilized by the second thread; determine whether a response to the query has been received within a second predetermined time period; and in response to a determination that: the response to the query has not been received within the second predetermined time period, or the response to the query has been received within the second predetermined time period and that the response to the query indicates that the nested message pump is not being utilized: determine that the second thread has entered into a hang condition; and enter a mitigation state to mitigate the effects of the hang condition.

In one embodiment of the foregoing system, the instance of the second browser includes: a browser determiner configured to: receive a request received at the first page to navigate a link to a second page, and determine that the second page is compatible with the second browser; a render engine configured to: render the second page hosted within the tab; and a host browser updater configured to: update the first browser regarding the navigation of the link by the instance of the second browser.

In another embodiment of the foregoing system, wherein the first thread is further configured to: in response to determining that the response to the query has been received within the second predetermined time period and in response to determining that the response to the query indicates that the nested message pump is being utilized by the second thread, reissue the query to the second thread.

In another embodiment of the foregoing system, the first thread is further configured to: store the hang resistance message in a message queue associated with the second thread; and the second thread comprises a root message pump configured to dequeue the hang resistance message when no other messages are stored in the message queue.

In another embodiment of foregoing system, the root message pump is configured to: dequeue the hang resistance message; wherein the second thread is configured to: send a response for the hang resistance message to the first thread; and wherein the first thread is configured to: determine that the second thread is responsive based on receiving the response for the hang resistance message.

In another embodiment of the foregoing system, the first thread is a browser window thread, and wherein the second thread is a content thread.

In another embodiment of the foregoing system, the first thread is further configured to: enable the user to interact with one or more user interface elements of the browser application while the second thread is in the hang condition.

In another embodiment of the foregoing system, the browser application is invoked from a different browser application.

A computer-readable storage medium having program instructions recorded thereon that, when executed by at least one processor, perform a method is further described herein. The method comprises: issuing, by a first thread of a browser application, a hang resistance message to a second thread of the browser application; determining, by the first thread, whether a response for the hang resistance message has been received from the second thread within a first predetermined time period; and in response to determining that the response has not been received within the first predetermined time period; issuing, by the first thread, a query to the second thread to determine whether a nested message pump is being utilized by the second thread; determining whether a response to the query has been received within a second predetermined time period; and in response to determining that: the response to the query has not been received within the second predetermined time period, or the response to determining that the response to the query has been received within the second predetermined time period and that the response to the query indicates that the nested message pump is not being utilized: determining that the second thread has entered into a hang condition; and entering a mitigation state to mitigate the effects of the hang condition.

In one embodiment of the foregoing computer-readable storage medium, the method further comprises in response to determining that the response to the query has been received within the second predetermined time period and in response to determining that the response to the query indicates that the nested message pump is being utilized by the second thread, reissuing, by the first thread, the query to the second thread.

In another embodiment of the foregoing computer-readable storage medium, the method further comprises storing the hang resistance message in a message queue associated with the second thread, wherein a root message pump of the second thread is configured to dequeue the hang resistance message when no other messages are stored in the message queue.

In another embodiment of the foregoing computer-readable storage medium, the method further comprises dequeuing, by the root message pump, the hang resistance message; sending, by the second thread, a response for the hang resistance message to the first thread; and determining, by the first thread, that the second thread is responsive based on receiving the response for the hang resistance message.

In another embodiment of the foregoing computer-readable storage medium, the first thread is a browser window thread, and wherein the second thread is a content thread.

In another embodiment of the foregoing computer-readable storage medium, said entering comprises: enabling the user to interact with one or more user interface elements of the browser application while the second thread is in the hang condition.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method, comprising:
issuing, by a first thread of a browser application, a hang resistance message to a second thread of the browser application;
determining, by the first thread, whether a response for the hang resistance message has been received from the second thread within a first predetermined time period; and
in response to determining that the response has not been received within the first predetermined time period:
issuing, by the first thread, a query to the second thread to determine whether a nested message pump is being utilized by the second thread;
determining whether a response to the query has been received within a second predetermined time period; and
in response to determining that:
the response to the query has not been received within the second predetermined time period, or
the response to determining that the response to the query has been received within the second predetermined time period and that the response to the query indicates that the nested message pump is not being utilized:
determining that the second thread has entered into a hang condition; and
entering a mitigation state to mitigate the effects of the hang condition.

2. The method of claim 1, further comprising:
in response to determining that the response to the query has been received within the second predetermined time period and in response to determining that the response to the query indicates that the nested message pump is being utilized by the second thread, reissuing, by the first thread, the query to the second thread.

3. The method of claim 2, further comprising:
storing the hang resistance message in a message queue associated with the second thread, wherein a root message pump of the second thread is configured to dequeue the hang resistance message when no other messages are stored in the message queue.

4. The method of claim 3, further comprising:
dequeuing, by the root message pump, the hang resistance message;
sending, by the second thread, a response for the hang resistance message to the first thread; and
determining, by the first thread, that the second thread is responsive based on receiving the response for the hang resistance message.

5. The method of claim 1, wherein the first thread is a browser window thread, and wherein the second thread is a content thread.

6. The method of claim 1, wherein said entering comprises:
enabling the user to interact with one or more user interface elements of the browser application while the second thread is in the hang condition.

7. The method of claim 1, wherein the browser application is invoked from a different browser application.

8. A system, comprising:
at least one processor circuit; and
at least one memory that stores program code configured to be executed by the at least one processor circuit, the program code comprising:
a first thread and a second thread of a browser application, the first thread configured to:
issue a hang resistance message to a second thread of the browser application;
determine whether a response for the hang resistance message has been received from the second thread within a first predetermined time period; and
in response to a determination that the response has not been received within the first predetermined time period:
issue a query to the second thread to determine whether a nested message pump is being utilized by the second thread;
determine whether a response to the query has been received within a second predetermined time period; and
in response to a determination that:
the response to the query has not been received within the second predetermined time period, or
the response to the query has been received within the second predetermined time period and that the response to the query indicates that the nested message pump is not being utilized:
determine that the second thread has entered into a hang condition; and
enter a mitigation state to mitigate the effects of the hang condition.

9. The system of claim 8, wherein the first thread is further configured to:
in response to determining that the response to the query has been received within the second predetermined time period and in response to determining that the response to the query indicates that the nested message pump is being utilized by the second thread, reissue the query to the second thread.

10. The system of claim 9, wherein the first thread is further configured to:
store the hang resistance message in a message queue associated with the second thread; and
wherein the second thread comprises a root message pump configured to dequeue the hang resistance message when no other messages are stored in the message queue.

11. The system of claim 10, wherein the root message pump is configured to:
dequeue the hang resistance message;
wherein the second thread is configured to:
send a response for the hang resistance message to the first thread; and
wherein the first thread is configured to:
determine that the second thread is responsive based on receiving the response for the hang resistance message.

12. The system of claim 8, wherein the first thread is a browser window thread, and wherein the second thread is a content thread.

13. The system of claim 8, wherein the first thread is further configured to:
enable the user to interact with one or more user interface elements of the browser application while the second thread is in the hang condition.

14. The system of claim 8, wherein the browser application is invoked from a different browser application.

15. A computer-readable storage medium having program instructions recorded thereon that, when executed by at least one processor, perform a method, the method comprising:
issuing, by a first thread of a browser application, a hang resistance message to a second thread of the browser application;
determining, by the first thread, whether a response for the hang resistance message has been received from the second thread within a first predetermined time period; and
in response to determining that the response has not been received within the first predetermined time period:
issuing, by the first thread, a query to the second thread to determine whether a nested message pump is being utilized by the second thread;
determining whether a response to the query has been received within a second predetermined time period; and
in response to determining that:
the response to the query has not been received within the second predetermined time period, or
the response to the query has been received within the second predetermined time period and the response to the query indicates that the nested message pump is not being utilized:
determining that the second thread has entered into a hang condition; and
entering a mitigation state to mitigate the effects of the hang condition.

16. The computer-readable storage medium of claim 15, wherein the method further comprises:
in response to determining that the response to the query has been received within the second predetermined time period and in response to determining that the response to the query indicates that the nested message pump is being utilized by the second thread, reissuing, by the first thread, the query to the second thread.

17. The computer-readable storage medium of claim 16, wherein the method further comprises:
storing the hang resistance message in a message queue associated with the second thread, wherein a root message pump of the second thread is configured to dequeue the hang resistance message when no other messages are stored in the message queue.

18. The computer-readable storage medium of claim 17, wherein the method further comprises:

dequeuing, by the root message pump, the hang resistance message;

sending, by the second thread, a response for the hang resistance message to the first thread; and determining, by the first thread, that the second thread is responsive based on receiving the response for the hang resistance message.

19. The computer-readable storage medium of claim 15, wherein the first thread is a browser window thread, and wherein the second thread is a content thread.

20. The computer-readable storage medium of claim 15, wherein said entering comprises:

enabling the user to interact with one or more user interface elements of the browser application while the second thread is in the hang condition.

\* \* \* \* \*